Feb. 10, 1959 R. W. JOHN 2,872,815
FLUID FLOW MEASURING GAUGE
Filed April 1, 1957 2 Sheets-Sheet 1

Inventor
Russell W. John
by Joseph E. Kerwin
Attorney

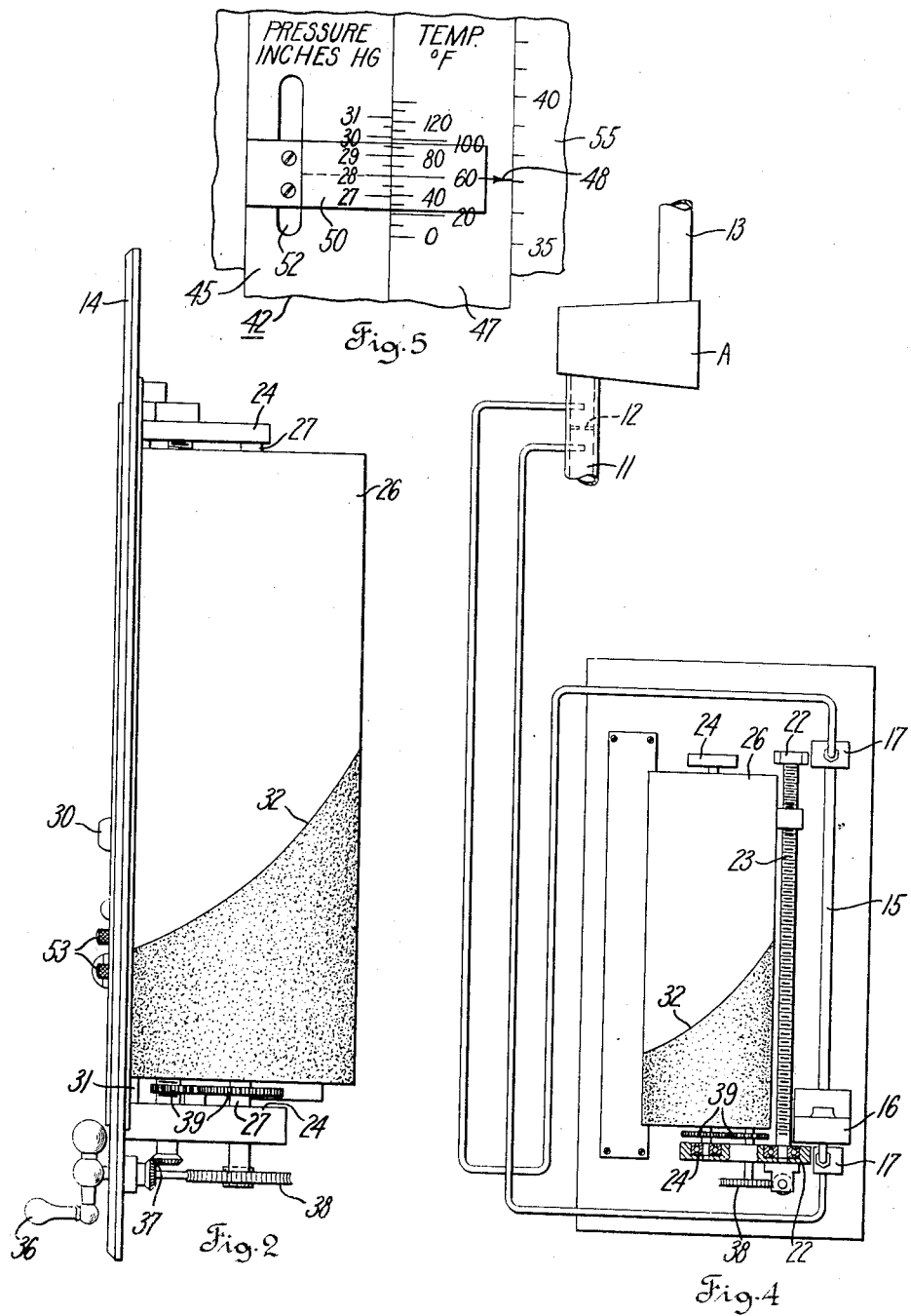

United States Patent Office 2,872,815
Patented Feb. 10, 1959

2,872,815

FLUID FLOW MEASURING GAUGE

Russell W. John, Milwaukee, Wis., assignor to Allis-Chalmers Manufacturing Company, Milwaukee, Wis.

Application April 1, 1957, Serial No. 649,754

4 Claims. (Cl. 73—401)

This invention relates to improvements in flow measuring gauges for compressible fluids, the gauge operating in conjunction with a metering device such as an orifice or similar pressure differential device, in which the pressure drop across the orifice is indicated by the height of a liquid column in a manometer tube, with means provided to insert corrections for barometric pressure and ambient temperature changes so that readings of the fluid flow rate may be taken directly in the form of standard flow units.

A gauge of this type is more fully described and claimed in copending application Serial No. 649,753, filed April 1, 1957, and of which the subject matter of this application constitutes in many respects an improvement.

The flow measuring gauge has been provided with several scales calibrated in logarithmic functions, and arranged so that the relative positioning of the respective scales and their indices under existing operating conditions provides for the measure of flow in standard units. The scale arrangement permits reading directly in standard cubic feet per minute without the need for slide rule or longhand corrections; sliding scales being provided permitting corrections of temperature and pressure changes. Once the flow measuring gauge scales are set to the existing temperature and pressure, the sliding scales can be moved as a unit which in turn eliminates operations that would ordinarily have to be repeated on a slide rule. The gauge also permits the average layman to calculate the flow rate, and in setting the temperature and pressure on the sliding scales, he is unknowingly performing an operation analogous to the slide rule, without being familiar with slide rule techniques.

The object of the present invention is to provide an improved fluid flow measuring gauge which employs a cylindrical drum with an etched logarithmic curve in corresponding relationship with the indicated pressure differential and so arranged with the logarithmic pressure, temperature and rate of flow scales, as to solve the formula:

$$Q = K' \sqrt{\frac{h_w P_1}{T_1}}$$

The foregoing and other objects and advantages will be apparent from the description herein set forth in the following specification detailing the important features of the invention and broadly claiming the same, in conjunction with the accompanying drawings, in which:

Fig. 2 is a side elevational view of the gauge shown in Fig. 1;

Fig. 4 is a schematic sketch of the remote connection of the gauge in a control center to the pressure conduit; and Fig. 5 is an enlarged view of the logarithmic sliding scales showing their respective calibrations and relative positioning to each other.

The flow measuring gauge solves the following flow equation based on equations published in Fluid Meters, fourth edition, A. S. M. E. research publication, in which:

(1) $$Q = K' \sqrt{\frac{h_w P_1}{T_1}}$$

(2) $\log Q = \log K' + \frac{1}{2} [(\log h_w + \log P_1) - \log T_1]$ of the variables represented, Q is flow in cubic feet per minute, $K'$ includes the flow coefficient, the standard condition being corrected to, and orifice diameter, $h_w$ weight of water column (representing orifice pressure drop), $T_1$ is ambient temperature in °Rankine, $P_1$ is barometric pressure in p. s. i. a.

The derivation of the above formula is developed in copending application, Serial No. 649,753, filed April 1, 1957.

Figure 3:
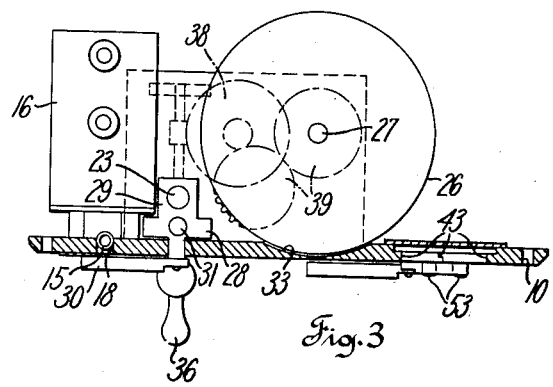
Fig. 3 is a top cross sectional view taken along line III—III as shown in Fig. 1.
Figure 1:
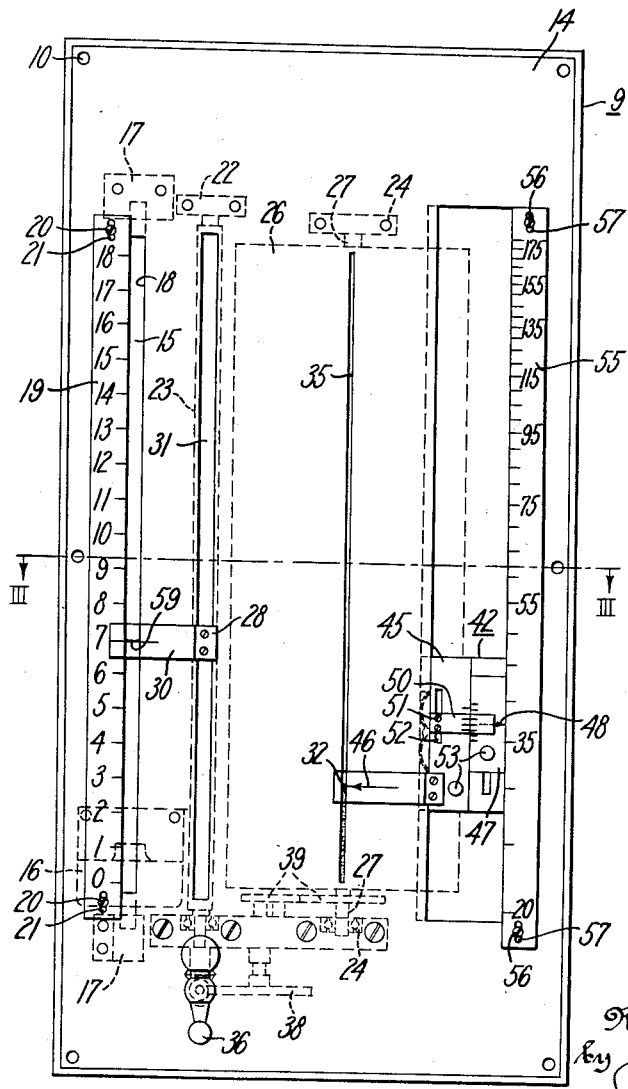
Fig. 1 is a front elevational view of the flow measuring gauge.

The flow measuring gauge 9 may be mounted or attached through the holes 10 provided on the gauge to brackets, not shown, attached to the compressor A, or remotely affixed to a control panel in some control center as shown in Fig. 4. The intake conduit 11 of the compressor A is provided with a nozzle or plate type orifice 12 in which the velocity of the incoming fluid such as air is increased producing subatmospheric pressure which in turn results in the necessary pressure differential required for the measurement of flow rate. The flow measuring gauge as shown in Fig. 1 consists of the following: retaining means or member such as a panel or plate 14. Affixed to the plate is a transparent liquid filled manometer tube 15 with a well 16 containing the liquid, used as indicating means for the registering of the pressure differential across the orifice plate 12 in the intake conduit 11 of the compressor A, the attachments 17 at the upper and lower ends of the tube being affixed directly to the plate 14 with the tube 15 securely inserted into the attachments. The tube 15 extends vertically and is exposed to the eye through a slot 18 in the face of the plate 14. Adjacent and parallel to the manometer tube is a linear scale 19 calibrated in inches and securely affixed to the plate by the screws 20 inserted into the elongated slots 21 provided on the linear scale. The range of measurement of the linear scale 19 covers the exposed portion of the manometer tube 15 that is showing through the slot 18, which in turn covers the operable differential pressure range of the compressor A.

Parallel and adjacent to the manometer tube 15 and rotatably affixed to the ball bearing fixtures 24 which in turn are affixed to the plate 14 is a linear lead screw 23 having in this case, ten threads per inch. Parallel and adjacent to the linear lead screw and rotatably affixed through shaft 27 inserted into the ball bearing fixtures 24, which in turn are affixed to the plate 14, is a cylindrical drum 26 having a logarithmic curve 32 etched upon the outer circumferential wall of the drum. A circular groove 33 is provided on the rear of plate 14 to accommodate and allow for the rotation of the cylindrical drum 26. The linear lead screw 23 has a follower 28 that consists of a sliding block 29 with a hairline cursor 30. A stabilizing rod 31 is provided to assist in the free movement of the follower on the linear lead screw. The sliding block is designed with standard V threads not shown, the V threads of the sliding block being lapped with the threads of the linear lead screw. A longitudinal slit 35, long enough to cover the operable pressure differential range of the manometer tube 15, is conveniently located in the plate 14 to allow for visual contact of the logarithmic curve 32 on the circumferential outer wall of the rotating drum 26. A handwheel 36 is attached to and extends through the plate 14; and through an intermeshing bevel gear arrangement 37 any movement of the handwheel 36 results in the corresponding movement of the linear lead screw 23 that in turn is responsible for the movement of the follower 28 on the linear lead screw. Motion translating means in the form of suitable gears 37, 38 and 39 are arranged between the handwheel 36 and the cylindrical drum 26, with the result that any movement of the linear lead screw 23 through turning of the handwheel 36 results in the corresponding movement of the cylindrical drum 26.

The purpose of having a linear lead screw and a cylindrical drum with a logarithmic curve etched upon the outer circumferential wall of the drum's surface is to convert a linear reading into log functions. This is accomplished by relating the pitch of the linear screw 23 to that of the logarithmic curve 32 on the cylindrical drum 26. Any indicated movement of travel by the follower 28 on the linear lead screw 23 will be transposed through the interconnecting gears 37, 38 and 39 to the cylindrical drum 26, which in turn will give the logarithm of the movement of travel of the follower 28 by exposing the logarithmic value on the curve 32 of the cylindrical drum 26 through the longitudinal slit 35 in the plate. As an example, in establishing the proper relationship between the linear lead screw and the logarithmic cylindrical drum, the prior mentioned ten threads per inch on the linear lead screw was chosen arbitrarily. With the cursor 30 of the follower 28 on the linear lead screw 23 pointing to zero on the linear scale 19, on ten revolutions of the linear lead screw the follower 28 will have travelled one inch. However, the portion of the logarithmic curve 32 etched upon the circumferential wall of the cylindrical drum 26 that can be seen through the longitudinal slit 35 of the plate 14 will be the log of that one inch of travel of the follower 28 on the linear lead screw; the follower 28 on traveling two inches will result in the logarithmic curve 32, showing through the longitudinal slot 35 of the plate, indicating the log of the two inches of travel and so on throughout the operable range of coverage that the follower 28 will travel.

With the follower on the linear lead screw limited to eighteen inches of travel in the application shown, the relationship established is that there will be one revolution of the cylindrical drum 26 for full travel of the follower 28 on the linear lead screw 23; or the linear lead screw must turn one hundred eighty times to move the follower from zero to eighteen inches, while the cylindrical drum will turn only once. For this particular application a gear ratio of 180 to 1 is provided in 37, 38 and 39, resulting in one hundred eighty revolutions of the linear lead screw for one revolution of the drum. From the bevel gear arrangement 37, into a worm and wheel 38 which gives great multiplication, to spur gears 39, the desired ratio is established and maintained.

Once having set up the proper gear ratio from the arbitrary selection of the number of threads on the linear lead screw, the next step is the cylindrical drum 26 itself. In this particular case as a matter of expediency a cylindrical drum with a 6⅝ inch diameter was chosen, as it corresponds with a standard piece of aluminum pipe, light in weight and with ease of appropriation. It can be any diameter just so long as the diameter chosen is large enough to provide accuracy and ease of plotting a logarithmic curve 32 upon the outer circumferential wall of the drum.

By accurately measuring the exact diameter of the drum, the circumference is calculated. Essentially, with the circumference of the drum as the abscissa, and the log of the maximum pressure differential as the ordinate of the drum, an ordinary log curve is plotted. Since eighteen inches are to be covered, throughout the pressure differential in this application, from the calculated circumference you then lay out the circumference on a piece of paper, divide it into eighteen equal segments, and that becomes the arbitrary abscissa of the curve. Throughout the eighteen inch increments of pressure differential the corresponding log is plotted as the ordinate, after which the piece of paper with the logarithmic curve is wrapped around the cylindrical drum. One method of impressing the desired logarithmic curve on the cylindrical drum 26 is to cut along the plot made and use that as a mask for painting the curve 32 on the drum itself.

Mounted within the plate 14 parallel and adjacent to the cylindrical drum is a pair of sliding scales 42 that are movable within a recess of the plate throughout the entire operable range of the manometer tube 15. The slides are juxtapositioned with respect to each other and are so arranged within the plate 14 through tongue and groove connections 43 that movement of the slides to the desired position is easily accomplished. The first slide disposed adjacent to the cylindrical drum 26 has a logarithmic pressure scale 45 thereon calibrated in barometric inches of mercury. An index 46 is placed on the pressure scale in a suitable position for alignment with the top of the logarithmic curve 32 on the outer circumferential wall of the cylindrical drum 26 that is exposed through the slit 35 of the plate.

The second slide adjacent and juxtapositioned with the first slide has a logarithmic temperature scale 47 calibrated in degrees of temperature and also has an index 48 suitably located. An adjustable magnifying glass cursor 50 with a hairline is provided for accurate alignment of temperature and pressure readings and is attached to the sliding scales 42 by the screws 51 inserted through an elongated slot 52 on the pressure scale 45. A knurled nut 53 is provided on each of the sliding scales 42 giving the operation of the gauge 9 the means to move the scales to the desired setting.

A logarithmic fluid flow scale 55 is located adjacent and parallel to the pair of slides 42 and is affixed to the plate 14 by the screws 56 placed through the slots 57 provided on the scale 55. The scale 55 is calibrated in cubic feet per minute, but is actually the logarithmic function for the indicated values shown on the scale.

A method of suitably locating the indices is to work out a sample problem where one of the index marks 48 can be selected arbitrarily for convenience, say at 60° F. as shown in Fig. 5, knowing the rest of the values in the sample problem so that these values are shown on the respective scales in the correct relationship, as shown in Fig. 1, the other index 46 on the pressure scale 45 may be set directly opposite and aligned with the top of the logarithmic curve 32 on the cylindrical drum 26 that shows through the slit 35 in the plate, the index 46 on the pressure scale at this related setting being permanently affixed.

In logarithms to take square roots of a log you divide by two, and to accomplish this same function on a slide rule type device a scale twice the length of the multiplication scale may be used. Therefore it is to be noted from the log values of the Formula 2 that the prior mentioned cylindrical drum 26 with the logarithmic curve 32, the logarithmic pressure scale 45 and the logarithmic temperature scale 47 are one-half the length of the logarithmic flow scale 55. To allow for deviation from the theoretical constant K′ to the actual field calibrated constant K′ in the formula previously stated, the K′ factor is taken care of in three locations; the temperature, pressure and flow scales. On the sliding temperature and pressure scales 42 a part of K′ is inserted by moving the indices 46 and 48 from their original relation to one where indices 46 and 48 will be more compactly located. By doing this a portion K′ is inserted inadvertently. To add the rest of K′ the volume or flow scale 55 is so placed as to give the correct answer to the sample problem used in locating the indices previously mentioned. This is accomplished through the slots 57 on the logarithmic flow scale 55 that are provided permitting vertical freedom of movement of the scale upon loosening of screws 56 that affix the scale to the plate 14. The desired rate of flow is read on the logarithmic standard flow scale 55 opposite the index 48 on the temperature scale 47. The physical length of the scales are dependent upon the pressure drop range, whereas the degree of accuracy required is dependent upon the ratio of scales used.

It is to be understood that the gauge 9 may be used to measure the rate of flow on the discharge side of a compressor A as well, however, the pressure in the conduit 13 on the discharge side must be given in absolute values to properly register in place of the barometric pressure on the proposed measuring gauge. This would necessitate a modificatinon of the logarithmic values on the pressure scale 45 to include the desired operating pressure range. This would be the same for use in any other type of conduit with fluid flow where it is not under atmospheric conditions, the operating pressure range at the point of measurement for differential pressure being expressed in absolute values.

The flow Equation 1 is solved by means of logarithms. Each variable of the equation is represented by a log scale on the gauge 9. The gauge is based upon the principle that when multiplying two numbers you may convert them to logs and add. The same idea is used in the operation of a slide rule. In this application the pressure is divided by the temperature (by matching up the temperature scale 47 and pressure scale 45 on the gauge) then the product is multiplied by the height of the water column 59 in the manometer tube. This is done by lining up the index 46 on the pressure scale with the top of the logarithmic curve 32 on the cylindrical drum 26 that is showing through the slit 35 of the plate 14, that portion of the curve 32 representing the log of the height of the water column 59.

One of the main advantages of the gauge 9 is that it is of a mechanical design in which no small intricate parts are employed which could be easily damaged. This gauge is rugged but limited to a given orifice 12 and a given flow range, since the constant K' is included in the indices and the field calibration of the logarithmic flow scale 55. However, the gauge 9 could be easily adapted to other flow conditions in a different orifice by simply changing the logarithmic flow scale 55 and establishing the proper scale relationship through a sample problem, as previously explained, to meet the new requirements.

To operate the flow measuring gauge 9, assume that the system is operating so that the liquid colunm 59 in the manometer tube 15 is at a certain level; by turning the handwheel 36 the cursor 30 of the follower 28 on the linear lead screw 23 is aligned with the liquid level 59 in the manometer tube. Referring to the sliding scales 42, the temperature on the logarithmic temperature scale 47 is set opposite the barometric pressure on the logarithmic pressure scale 45 for existing atmospheric conditions under which the flow gauge is operating. Though the temperature scale 47, as shown, is in degrees Fahrenheit, it is actually in degrees Rankine or absolute in which the Rankine is equal to the Fahrenheit reading plus four hundred sixty degrees. The log functions of the respective values of the absolute temperatures are indicated on the scale 47, but the corresponding degrees Fahrenheit are marked for convenience. Though the Formula 1 gives pressure in pounds per square inch, barometric pressure in inches of mercury is used on the pressure scale 45.

To facilitate and make easier and more accurate the eradings on the respective sliding scales, a plastic magnifying element is used such as the cursor with hairline aid 50 shown. The index 46 affxed to the pressure scale 45 is also a plastic magnifying element utilizing a hairline, and another of the plastic magnifying elements 30 is affixed to the follower 28 on the linear lead screw 23 which is in cooperation with the linear scale 19 and the liquid filled manometer tube.

After making the proper alignment of the existing temperature and pressure on the respective scales 45 and 47, the entire sliding scale 42 is moved as a unit so the index 46 on the pressure scale is aligned with the top of the logarithmic curve 32 on the outer wall of the cylindrical drum 26 that is showing through the slit 35 on the panel 14. It is again noted that upon any movement of the linear lead screw 23, the corresponding movement of the cylindrical drum 26 through the motion translating means, such as gears 37, 38 and 39, is accomplished so that the height of the pressure differential indicated by the follower 28 is transposed as the log function of that height to the logarithmic curve on the cylindrical drum 26. The rate of flow is in cubic feet per minute and is indicated opposite the index 48 on the temperature scale 47; the means of combining the logarithm of the pressure differential, the logarithm of the temperature and the logarithm of the pressure to give the log of the volumetric flow rate, which in turn is read back directly as standard flow rate, is the result of the structure herein defined. The logarithmic standard flow scale 55 as previously pointed out is adjusted vertically to change the position of its datum point to compensate for constant K', variations noted in the formula or other factors such as deviation of the actual to theoretical orifice characteristics involved in the practical use of the instrument.

While the form of embodiment of the invention as herein disclosed constitutes a preferred form, it is to be noted that other forms might be adopted, all coming within the scope of the claims which follow.

What is claimed is:

1. A fluid flow measuring gauge comprising retaining means, pressure responsive indicating means subject to pressure conditions of compressible fluid under flow and affixed to said retaining means, a linear lead screw coacting with a cylindrical drum through motion translating means, a logarithmic curve etched on the circumferential wall of said cylindrical drum, said linear lead screw and cylindrical drum rotatably affixed to said retaining means and parallel to said indicating means, a follower on said linear screw adapted to move upon rotation of said screw and cooperating with said indicating means, means for turning said linear screw to adjust the follower relative to said indicating means, a pair of juxtapositioned logarithmic sliding scales each having an index and affixed to said retaining means and adjacent and parallel to said cylindrical drum, the first of said scales calibrated in units of pressure, the second of said scales calibrated in degrees of temperature, means for adjustably positioning said sliding scales with the index of said first scale coordinated with the logarithmic curve on said cylindrical drum, and a logarithmic standard flow scale adjustably affixed to said retaining means and adjacent and parallel to said sliding scales, said flow scale calibrated in fluid volume rates of flow under standard conditions to be coordinated with the index on said second scale, the relative disposition of the scales being such that the volume rate of flow of compressible fluid may be read directly for operating temperatures and pressure conditions on said flow scale in standard units.

2. A flow measuring gauge in which the rate of fluid flow is determined by the formula:

$$Q = K' \sqrt{\frac{h_w P_1}{T_1}}$$

of the variables represented, Q is flow in cubic feet per minute, K' includes the flow coefficient, the standard condition being corrected to, the orifice diameter, $h_w$ is height of water column (representing orifice pressure drop), $T_1$ is ambient temperature in °Rankine, $P_1$ is barometric pressure in p. s. i. a., comprising retaining means, pressure responsive indicating means subject to pressure conditions of a compressible fluid underflow and affixed to said retaining means, a linear lead screw coacting with a cylindrical drum through motion translating means, a logarithmic curve etched on the circumferential wall of said cylindrical drum, said linear lead screw and cylindrical drum rotatably affixed to said retaining means and parallel to said indicating means, a follower on said linear screw adapted to move upon rotation of said screw and cooperating with said indicating means, means for turning said linear screw to adjust the follower relative to said indicating means, a pair juxtapositioned logarithmic sliding scales each having an index and affixed to said retaining means and adjacent and parallel to said cylindrical drum, the first of said scales calibrated in units of pressure, the second of said scales calibrated in degrees of temperature, means for adjustably positioning said sliding scales with the index of said first scale coordinated with the logarithmic curve on said cylindrical drum, and a logarithmic standard flow scale adjustably affixed to said retaining means and adjacent and parallel to said sliding scales, said flow scale calibrated in fluid volume rates of flow under standard conditions to be coordinated with the index on said second scale, the relative disposition of the scales being such that the volume rate of flow of compressible fluid may be read directly for operating temperatures and pressure conditions on said flow scale in standard units.

3. A fluid flow measuring gauge comprising a plate, a linear scale graduated in inches affixed to said plate, a liquid filled manometer tube responsive to a pressure differential of a compressible fluid underflow and affixed to said plate and adjacent and parallel to said linear scale, a linear lead screw adjacent and parallel to said manometer tube and rotatably affixed to said plate, a cylindrical drum adjacent and parallel to said linear lead screw and rotatably affixed to said plate, a follower attached to said linear lead screw and having a sliding block with a pointer, a handwheel for turning said linear lead screw to adjust the follower thereon relative to the height of liquid in said manometer tube, intermeshing gears arranged to move the cylindrical drum on movement of the linear lead screw through turning of said handwheel, a logarithmic curve on the circumferential wall of said cylindrical drum, a first and a second slide affixed to said plate and adjacent and parallel to said cylindrical drum, said first slide having thereon a logarithmic pressure scale calibrated in barometric inches of mercury and having an index coordinated with the logarithmic curve on said cylindrical drum, said second slide having thereon a logarithmic temperature scale calibrated in degrees of temperature and having an index, a logarithmic standard flow scale affixed to said plate and adjacent and parallel to said second slide and calibrated in cubic feet per minute, said index on said second slide to be coordinated with said flow scale, the relative disposition of the scales being such that upon turning of said handwheel adjusting the follower on said linear lead screw to the indicated height of liquid in said manometer tube, the height will be transposed to log functions through the corresponding movement of the cylindrical drum with the logarithmic curve by said intermeshing gears, the aligning of pressure and temperature conditions on said first and second slides and aligning of said index on said first slide with the indicated logarithmic value on said cylindrical drum, the index on said second slide will directly indicate the flow rate on said logarithmic flow scale.

4. A flow measuring gauge, in which the rate of fluid flow is determined by the formula:

$$Q = K' \sqrt{\frac{h_w P_1}{T_1}}$$

of the variables represented, Q is flow in cubic feet per minute, K' includes the flow coefficient, the standard condition being corrected to, and orifice diameter, $h_w$ is height of water column (representing orifice pressure drop), $T_1$ is ambient temperature in °Rankine, $P_1$ is barometric pressure in p. s. i. a., comprising a plate, a linear scale graduated in inches affixed to said plate, a liquid filled manometer tube responsive to a pressure differential of a comprehensible fluid under flow and affixed to said plate and adjacent and parallel to said linear scale, a linear lead screw adjacent and parallel to said manometer tube and rotatably affixed to said plate, a cylindrical drum adjacent and parallel to said linear lead screw and rotatably affixed to said plate, a follower attached to said linear lead screw and having a sliding block with a pointer, a handwheel for turning said linear lead screw to adjust the follower thereon relative to the height of liquid in said manometer tube, intermeshing gears arranged to move the cylindrical drum on movement of the linear lead screw through turning of said handwheel, a logarithmic curve on the circumferential wall of said cylindrical drum, a first and a second slide affixed to said plate and adjacent and parallel to said cylindrical drum, said first slide having thereon a logarithmic pressure scale calibrated in barometric inches of mercury and having an index coordinated with the logarithmic curve on said cylindrical drum, said second slide having thereon a logarithmic temperature scale calibrated in degrees of temperature and having an index, a logarithmic standard flow scale affixed to said plate and adjacent and parallel to said second slide and calibrated in cubic feet per minute, said index on said second slide to be coordinated with said flow scale, the relative disposition of the scales being such that upon turning of said handwheel adjusting the follower on said linear lead screw to the indicated height of liquid in said manometer tube, the height will be transposed to log functions through the corresponding movement of the cylindrical drum with the logarithmic curve by said intermeshing gears, the aligning of pressure and temperature conditions on said first and second slides and aligning of said index on said first slide with the indicated logarithmic value on said cylindrical drum, the index on said second slide will directly indicate the flow rate on said logarithmic flow scale.

References Cited in the file of this patent
UNITED STATES PATENTS

| | | |
|---|---|---|
| 1,584,860 | Huff | May 18, 1926 |
| 1,894,366 | Cantacuzene | Jan. 17, 1933 |
| 2,759,668 | Hielle | Aug. 21, 1956 |

FOREIGN PATENTS

| | | |
|---|---|---|
| 304,713 | Germany | Apr. 2, 1918 |